April 19, 1966  C. W. FLAIRTY  3,247,447
FAST ACTION CURRENT LIMITING PROTECTIVE
CIRCUIT FOR PHASE SHIFT CONTROL DEVICES
Filed Oct. 23, 1962  3 Sheets-Sheet 1
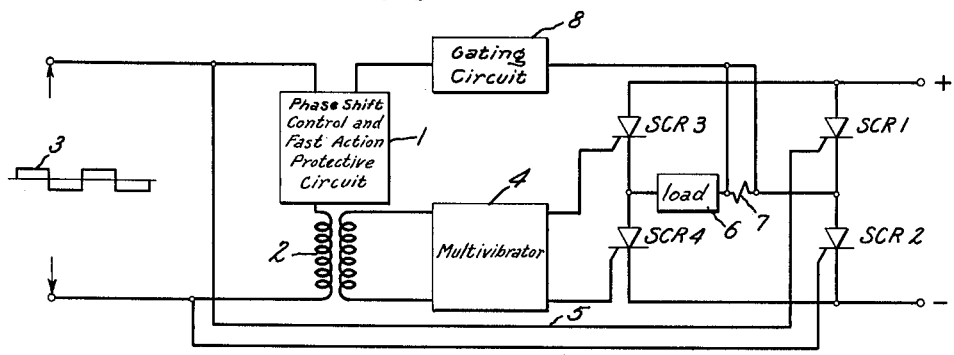
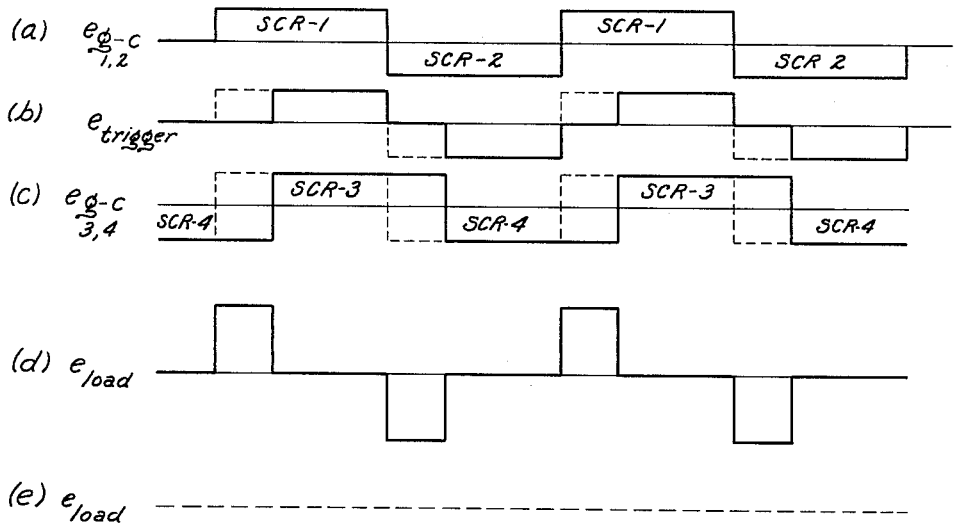
Inventor
Clarence W. Flairty
by Charles W Helzer
His Attorney.

April 19, 1966  C. W. FLAIRTY  3,247,447
FAST ACTION CURRENT LIMITING PROTECTIVE
CIRCUIT FOR PHASE SHIFT CONTROL DEVICES
Filed Oct. 23, 1962  3 Sheets-Sheet 2
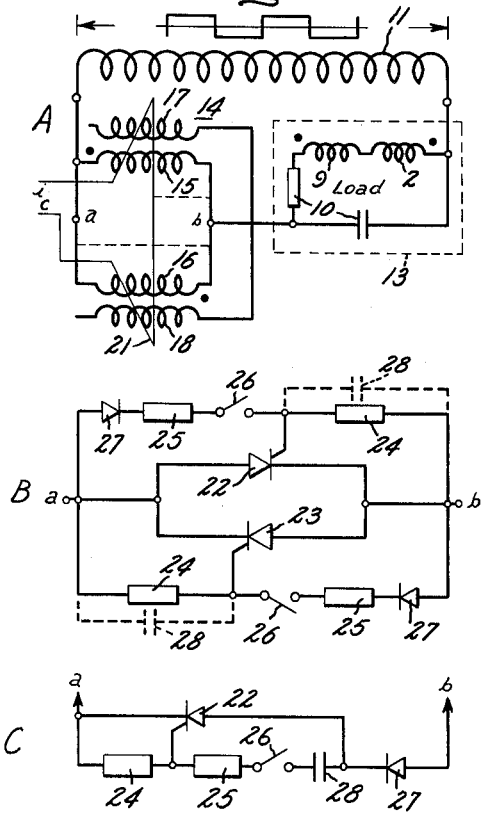
Fig. 3.
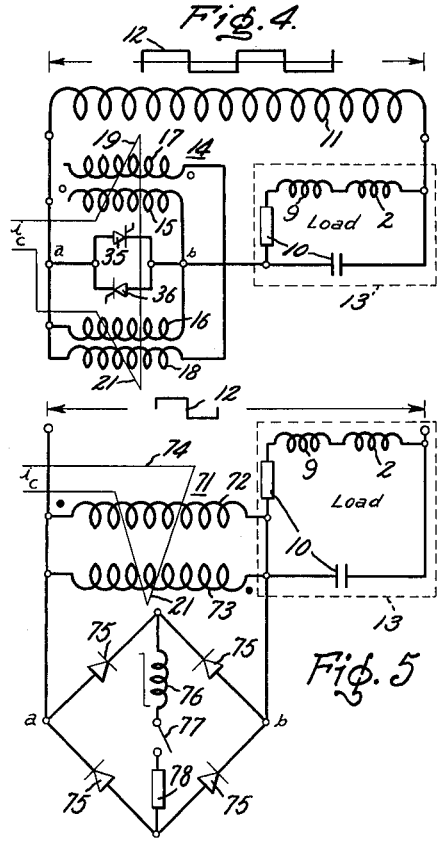
Fig. 4.
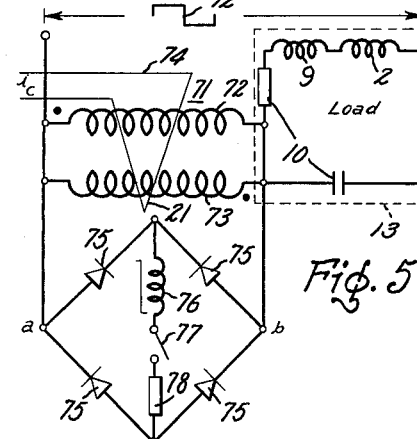
Fig. 5.
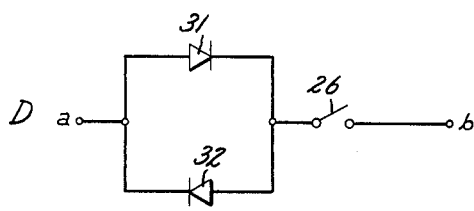
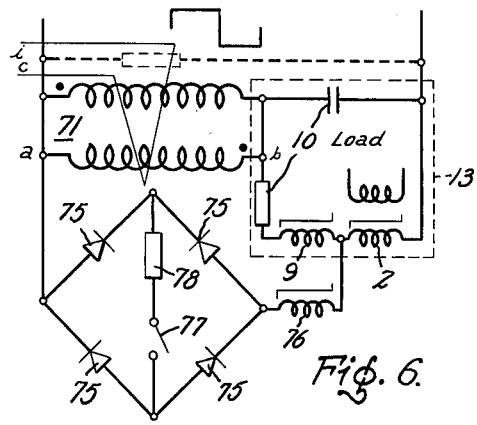
Fig. 6.
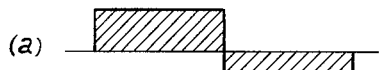
(a)
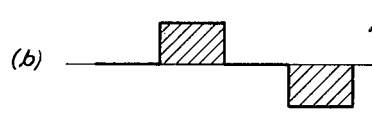
(b)
(c)
Fig. 7.
Inventor
Clarence W. Flairty
by Charles W. Helzer
His Attorney April 19, 1966 C. W. FLAIRTY 3,247,447
FAST ACTION CURRENT LIMITING PROTECTIVE
CIRCUIT FOR PHASE SHIFT CONTROL DEVICES
Filed Oct. 23, 1962 3 Sheets-Sheet 3
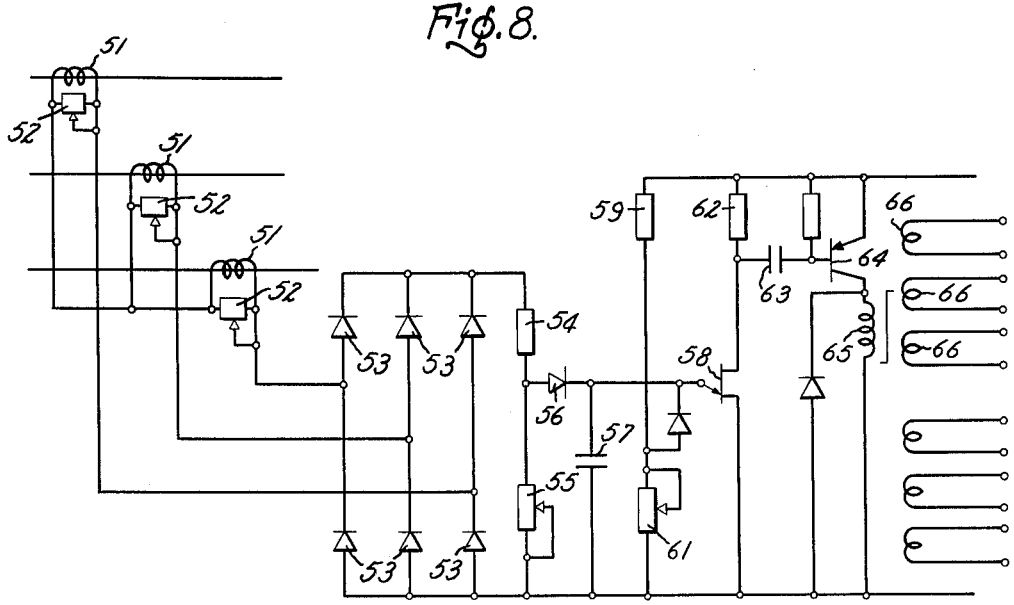
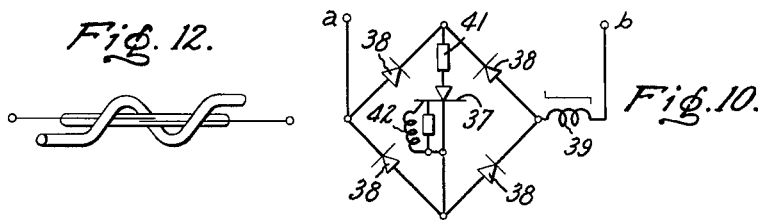
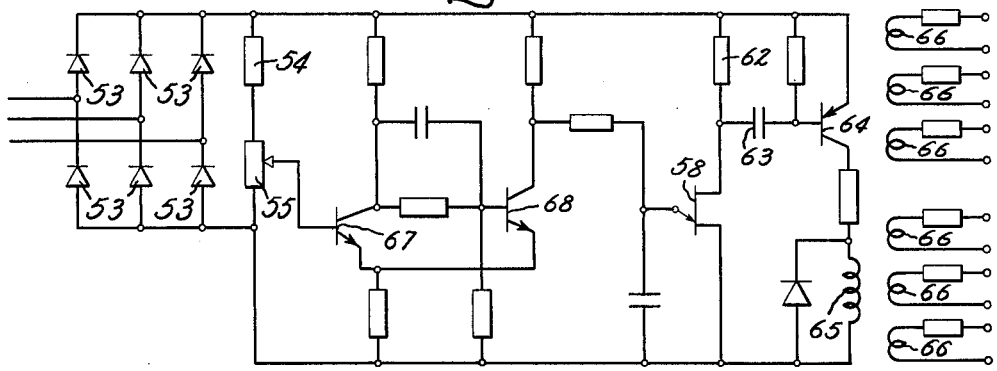
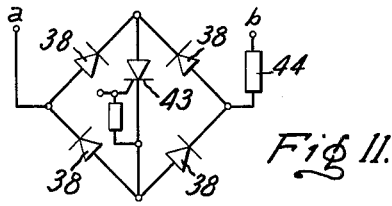
Inventor
Clarence W. Flairty
by Charles W. Helzer
His Attorney

United States Patent Office 3,247,447
Patented Apr. 19, 1966

3,247,447
FAST ACTION CURRENT LIMITING PROTECTIVE CIRCUIT FOR PHASE SHIFT CONTROL DEVICES
Clarence W. Flairty, Scotia, N.Y., assignor to General Electric Company, a corporation of New York
Filed Oct. 23, 1962, Ser. No. 232,353
13 Claims. (Cl. 321—14)

The present invention relates to a fast action protective circuit for electric circuits which employ a phase shift type of control.

More particularly, the invention relates to a fast response current limiting protective circuit employed in conjunction with a phase shift type of control to rapidly decrease the output voltage, hence output current from an inverter circuit or other load equipment in response to an overload condition.

There are a number of circuits available to the industry which employ saturable reactors, amplistats, or other similar devices for shifting the phase of an applied input electric signal to thereby control the magnitude of the voltage supplied from the output of the electric circuit employing such device as a control element. With a phase shift type of control of this nature, it is customary to employ a control winding to which a control signal is supplied in order to control the point in the period of the applied input electric signal at which a saturable core saturates to thereby achieve a phase shift control of the output signal derived from the device. While such a phase shift type of control has many desirable features, it is an inherent characteristic of such a control for a certain time delay to occur after the application of a control signal to the control winding before the circuit responds to the applied control signal. While this inherent time delay is not harmful for many applications, in certain situations such as the occurrence of an overload condition, it can be the cause of exposing the equipment being controlled to a dangerous overload condition for too great a period and result in damage to the equipment. To circumvent such a result, the present invention was devised.

It is, therefore, a primary object of the present invention to provide a fast action protective circuit which is employed in conjunction with a phase shift type of control for rapidly decreasing the output current from a circuit being controlled in response to an overload condition.

In practicing the invention, a fast action protective circuit for a phase shift type of control is provided which includes in combination an overload condition sensing means connected in the output of the electric circuit (such as an inverter) being controlled, and fast-acting switch means operatively coupled across the phase shift control in parallel circuit relationship. By this arrangement, the fast-acting switch means is actuated by the overload condition sensing means for short circuiting the phase shift control in response to an overload condition being sensed. In a preferred embodiment of the invention, the phase shift control comprises a saturable reactor, and the fast-acting switch means preferably comprises at least one silicon controlled rectifier connected in parallel circuit relationship with the saturable reactor and having its gate electrode operatively coupled to the overload condition sensing means connected in the output of the electric circuit such as an inverter being controlled.

Other objects, features, and many of the attendant advantages of this invention will be appreciated more readily as the same becomes better understood by reference to the following detailed description when considered in connection with the accompanying drawings, wherein like parts in each of the several figures are identified by the same reference character, and wherein:

FIGURE 1 is a schematic block diagram of a new and improved fast action, current limiting protective circuit for an inverter construction in accordance with the invention;

FIGURE 2 is a series of voltage vs. time characteristic curves which illustrate the mode of operation of the protective circuit shown in FIGURE 1;

FIGURE 3 is a circuit diagram of one form of a protective circuit constructed in accordance with the invention;

FIGURE 4 is a schematic circuit diagram of a second form of protective circuit constructed in accordance with the invention;

FIGURE 5 is a schematic circuit diagram of still a third form of protective circuit constructed in accordance with the invention;

FIGURE 6 is a schematic circuit diagram of still a fourth embodiment of the invention;

FIGURE 7 is a series of voltage vs. time wave forms illustrating the operation of the circuits shown in FIGURES 1–4;

FIGURE 8 is a schematic circuit diagram of a firing circuit comprising a part of the over-all protective circuit shown in FIGURE 1;

FIGURE 9 is a schematic circuit diagram of a second form of firing or gating circuit used in conjunction with the protective circuit of FIGURE 1;

FIGURE 10 is a schematic circuit diagram of a modified form of short circuiting silicon controlled rectifier circuit that may be employed in the protective circuit arrangements shown in FIGURES 1–4;

FIGURE 11 is a schematic circuit diagram of a second form of short circuiting silicon controlled rectifier circuit that can be used in conjunction with the protective circuit arrangements shown in FIGURES 1–4; and FIGURE 12 is a perspective view of a suitable solenoid actuated red switch that can be used in the embodiments of the invention shown in FIGURES 1, 3, and 4.

A functional block diagram of an inverter control scheme employing a phase shift control and fast action current limiting protective circuit 1 is shown in FIGURE 1. The phase shift control and fast action limiting protective circuit 1 is connected in operating relationship with a bridge inverter comprised by four silicon controlled rectifiers SCR–1 through SCR–4, and illustrates a preferred manner of using the present invention. The phase shift control and fast action protective circuit 1 is connected in series circuit relationship with primary winding 2 of a coupling transformer. The series circuit thus formed is connected across a source of switching potential (not shown) which has essentially a square wave form output as illustrated at 3. In normal operation, phase shift control and fast action protective circuit 1 will normally serve to phase shift the leading edge of the square wave potential 3 and to produce a phase shifted output signal across the primary winding 2 which is supplied to a multivibrator 4. The multivibrator 4 has its output connected to two of the gating electrodes of silicon controlled rectifiers SCR–3 and SCR–4 connected in series circuit relationship across a direct current power supply, and serves to develop a square wave trigger potential that turns on each of the silicon controlled rectifiers SCR–3 and SCR–4 in a preplanned sequence determined by the amount of phase shift injected by circuit 1. Concurrently, unaltered switching potential 3 is applied across conductors 5 to the gating electrodes of the silicon controlled rectifiers SCR–1 and SCR–2 which likewise are connected in series circuit relationship across the direct current power supply and comprise a part of the bridge inverter. The bridge inverter is completed by load 6 that is connected between the juncture of silicon controlled rectifiers SCR–3 and SCR–4 and the juncture of silicon controlled rectifiers SCR–1 and SCR–2. Connected in series circuit relationship with load 6 is an overcurrent sensing resistor or current transformer 7 having a low inductance which is connected back to the input of gating circuit 8 that in turn is connected back to the phase shift control and fast action protective circuit 1.

The operation of the circuit shown in FIGURE 1 can best be understood in connection with the voltage wave forms illustrated by the characteristic curves of FIGURE 2. FIGURE 2(a) illustrates the square wave trigger potential 3 which is applied to the gating electrodes of silicon controlled rectifiers SCR–1 and SCR–2 directly across conductor 5. FIGURE 2(b) illustrates the phase shifted triggering potential developed across the primary winding 2 by the fast action protection circuit and which is supplied to multivibrator 4. FIGURE 2(c) illustrates the phase shifted, square wave output triggering potential developed by multivibrator 4 and applied to the gating electrodes of silicon controlled rectifiers SCR–3 and SCR–4. It should be noted that the gating potential developed by multivibrator 4 has the same period and frequency as the original trigger, potential 3, but that it has been phase shifted by an amount determined by the phase shift control and fast action, current limiting protection circuit 1. From a comparison of FIGURES 2(a) and 2(c), it can be seen that there will be periods of overlapping conduction when silicon controlled rectifier SCR–4 and silicon controlled rectifier SCR–1 are turned on concurrently, and likewise, similar periods of overlapping conduction when silicon controlled rectifier 3 and silicon controlled rectifier 2 are turned on. It is during these periods of overlapping conduction that load current is supplied to load 6 as illustrated in FIGURE 2(d) of the drawings. If it is desired to increase the load current shown in FIGURE 2(d), then the periods of overlapping conduction are increased. If it is desired to decrease the load current supplied to load 6 by the bridge inverter, then the periods of overlapping conduction are decreased. In order to increase or decrease the periods of overlapping conduction, it is only necessary to increase or decrease the amount of phase shift inserted by the phase shift control and fast action protective circiut 1. If, for example, the amount of phase shift inserted by circuit 1 is reduced to zero, as indicated by the dotted curve shown in FIGURE 2(b), then there would be no overlapping periods of conduction and no load current would be supplied through load 6. As a result, the load current would drop to zero as indicated in FIGURE 2(e) of the drawings. The present invention provides a means for quickly driving the phase shift control and fast action protective circuit 1 to a condition of zero phase shift where zero load current is supplied to load 6, as illustrated by FIGURE 2(e) of the drawings.

FIGURE 3 is a schematic circuit diagram of a phase control type of control circuit which has been modified to incorporate the fast action, current limiting protective features of the present invention. In the circuit of FIGURE 3 of the drawings, winding 11 may comprise either the primary or secondary winding of a coupling transformer, the load impedance of an inverter, or some similar coupling winding wherein an alternating current potential having a wave form such as shown at 12 appears across its terminal to be supplied to a load device illustrated by dotted box 13. While the load device might vary greatly in the particular ararngement shown, it is constituted by primary winding 2 of an output pulse transformer and a pair of wave shape components in the form of second saturable reactor 9 and resistance-capacitance wave shape network 10. In order to control the voltage being supplied to load 13, a phase control type circuit, such as a saturable reactor shown broadly at 14, is employed. The term "saturable reactor" as used hereinafter in the specification is intended to apply generically to all saturable type control elements such as amplistats, magnetic ampifiers, and the like, and is considered to be generic thereto. The saturable reactor 14 is actually comprised by two separate saturable reactors whose primary windings 15 and 16, respectively, are connected in parallel circuit relationship and secondary windings 17 and 18, respectively, are open circuited in the manner shown. Each set of windings 15 and 17, and 16 and 18 has a respective associated control winding 19 or 21 for controlling the point in the period of an applied alternating current potential, such as that shown at 12, at which the core of the device saturates. Such devices are well known in the art, as described, for example, in the textbook entitled, "Magnetic Amplifiers," by Herbert F. Storm, published by John Wiley and Sons, Inc., New York (1955). It is a characteristic of a saturable reactor of the type shown in FIGURE 3 to exhibit a normal impedance to an electric current supplied thereto for the period of time required for the core of the saturable reactor to saturate, after which the impedance of the saturable reactor drops essentially to zero. The point at which the saturable reactor saturates is determined by the control current $i_c$ supplied to control windings 19 and 21, respectively. The effect of changing the control current in control windings 19 and 21 can be better described in connection with FIGURE 7 of the drawings, wherein FIGURE 7(a) illustrates a condition where there is essentially maximum control current flowing in control windings 19 and 21, and the saturable reactor saturates almost instantaneously. As a consequence, the potential supplied to load 13 will appear as in FIGURE 7(a) of the drawings with very little or no phase shift with respect to the input voltage. However, if the control current $i_c$ is decreased to some intermediate value, the saturable reactor will operate to hold off the input potential shown at 12 for a period of time determined by the value of the control current, and some intermediate value wave form, such as shown in FIGURE 7(b) will appear across load 13. A further decrease in control current $i_c$ to a minimum value will shift the leading edge of the potential across load 13 even further to a minimum value such as that shown in FIGURE 7(c) of the drawings. It can be appreciated, therefore, that by varying the value of control current $i_c$ supplied to the control windings of the saturable reactors, it is possible to shift the phase of the leading edge of voltage supplied by saturable reactor 14 and supply winding 11 to load 13 from a zero phase shift value (such as shown in FIGURE 7(a) of the drawing) where essentially the full potential appearing across supply winding 11 is applied across load 13 to a maximum value of phase shift such as shown in FIGURE 7(c). Because of the nature of saturable reactor 14, a time delay is inherent in going from the condition shown in FIGURE 7(a) to the condition shown in FIGURE 7(c), or more important, from the condition shown in FIGURE 7(c) to the condition shown in FIGURE 7(a) where the phase shift will be reduced substantially to zero. This is due to the time required for the flux through windings 15 through 18 to build up or decay down, and hence, inherently limits the response time of the control circuit. In order to circumvent some of the difficulties encountered because of the relatively slow time response of the phase shift control circuit shown in FIGURE 3A, the fast action current limiting protective circuit comprising the present invention was devised. This fast action protective circuit is adapted to be connected between the terminal points $a$ and $b$ of the circuit shown in FIGURE 3A.

One form of a suitable fast action protective circuit for connection between the terminal points $a$ and $b$ of the circuit arrangement of FIGURE 3A is shown in FIGURE 3B of the drawing. This fast action protective circuit is comprised by a pair of back-to-back, parallel-connected silicon controlled rectifiers 22 and 23, which are adapted to be connected in parallel circuit relationship between terminal points $a$ and $b$. The gate electrodes of silicon controlled rectifiers 22 and 23 are connected to respective firing circuits comprised by a pair of voltage dividing resistors 24 and 25 connected in series circuit relationship with a solenoid actuated reed switch 26 and an isolating diode 27. If desired, a smoothing capacitor, illustrated in dotted lines at 28, may be connected in parallel with resistors 24. The midtap point of voltage dividing resistors 24 and 25 is connected to the gating electrode of respective silicon controlled rectifiers 22 and 23. By this construction, upon the solenoid actuated reed switch 26 being closed, a potential will appear across voltage dividing resistors 24 and 25 which is applied to the gating electrodes of silicon controlled rectifiers 22 and 23 to turn them on. Upon silicon controlled rectifiers 22 and 23 being turned on, they will short circuit the turns of windings 15 through 18 of saturable reactor 14. The effect is to return the phase shift type control comprised by saturable reactor 14 to a zero phase shift condition almost instantaneously.

FIGURE 3C of the drawings illustrates a single phase version of fast action protective circuit adapted to be connected between terminal points a and b of the circuit shown in FIGURE 3A. In operation, the arrangement in FIGURE 3C functions in precisely the same manner as one side of the circuit shown in FIGURE 3B, and hence, will not be again described in detail. FIGURE 3D of the drawing shows still a third version of protective circuit for connection between terminal points a and b of the arrangement in FIGURE 3A. In the arrangement of FIGURE 3D, a pair of back-to-back, parallel-connected diodes 31 and 32 are adapted to be connected across terminals a and b through a solenoid actuated reed switch 26.

A different form of fast action, current limiting protective circuit is shown in FIGURE 4 of the drawings. The circuit of FIGURE 4 is identical to the FIGURE 3 circuit with the exception that a pair of back-to-back, parallel-connected silicon controlled rectifiers 35 and 36 are connected between terminals a and b to short circuit the windings of saturable reactor 14. In place of the back-to-back, parallel-connected silicon controlled rectifiers 35 and 36, it would be possible to substitute a circuit such as shown in FIGURE 10 of the drawing between terminals a and b of the circuits of FIGURES 3 or 4. The arrangement shown in FIGURE 10 requires only one silicon controlled rectifier 37 connected between one pair of opposite terminals of a diode bridge comprised by diodes 38, with the remaining pair of opposed terminals of the diode bridge being connected across terminals a and b of the circuits of FIGURE 3 through a suitable time delay reactor 39. The single silicon controlled rectifier 37 may be connected in series with current limiting resistor 41 and has its gate electrode connected to output winding 42 of a pulse transformer comprising a part of the gating circuit. With the arrangement of FIGURE 10, it is possible to effectively isolate silicon controlled rectifier 37 from delay reactor 39. This allows a second means for controlling the phase of the output signal supplied to load 13 and serves to inject a small, controllable time delay in the operation of the fast action, current limiting protective circuit. As a consequence, upon the short circuiting silicon controlled rectifier 37 being turned on, a short delay determined by the time required to saturate delay reactor 39 will occur prior to short circuiting the primary control saturable reactor 14. This small time delay may be adjusted to any value in order to delay somewhat the response of the protective circuit to an overload condition should it be desirable to do so from the standpoint of the equipment with which the control is being used.

A somewhat similar protective circuit arrangement is shown in FIGURE 11 of the drawings. The circuit of FIGURE 11 employs a diode bridge comprised by diodes 38 and a single short circuiting silicon controlled rectifier 43 connected between one pair of opposed terminals of the diode bridge. The remaining pair of the opposed terminals of the diode bridge is connected between terminals a and b of the fast action protective control circuit of either FIGURE 3 or FIGURE 4 through current limiting resistor 44 whose function is to limit somewhat the short circuit current through short circuiting silicon controlled rectifier 43 upon SCR-43 being turned on.

A suitable firing circuit for use with the short circuiting silicon controlled rectifier circuit arrangements of FIGURES 4, 10, or 11 is illustrated in FIGURE 8 of the drawings. In FIGURE 8, a plurality of current sensing transformers 51 are shown surrounding a respective load current carrying conductor for each of the phases of a three-phase supply. Each of the current sensing transformers 51 are connected in parallel with variable resistor 52 for adjusting the sensitivity of the current sensing arrangement. The three-phase circuit thus formed is connected to the junction of a plurality of coupling diodes 53, which are in turn connected across a pair of voltage dividing resistors 54 and 55. The juncture of resistors 54 and 55 is connected through coupling diode 56 across smoothing capacitor 57 that in turn is connected to the emitter electrode of a unijunction transistor 58. Unijunction transistor 58 has suitable biasing potentials applied to its emitter electrode from a voltage divider comprised by fixed resistor 59 and variable resistor 61 connected in series circuit relationship across a source of direct current electric potential. The variable resistor 61 allows a means for adjusting the sensitivity of transistor 58 to turn-on signals supplied to it from overcurrent sensing transformers 51. The unijunction transistor 58 is connected in series circuit relationship with resistor 62 across the source of direct current power with the junction of resistor 62 and a gate electrode of unijunction transistor 58 being coupled through coupling capacitor 63 to the base electrode of PNP transistor 64. The PNP transistor 64 is connected in series circuit relationship with primary winding 65 of a pulse transformer whose multiple secondary windings 66 are connected to the gating electrodes or respective ones of the short circuiting silicon controlled rectifiers such as SCR-35 and SCR-36 in the circuit arrangement of FIGURE 4, SCR-37 in the circuit arrangement of FIGURE 10, or SCR-43 of the circuit arrangement of FIGURE 11. In operation, upon an overcurrent condition being sensed by current transformers 51, a signal pulse will be supplied through coupling diodes 53 and 56 to the emitter electrode of unijunction transistor 58. The sensitivity of unijunction transistor 58 has been initially adjusted by variable resistor 61 to respond to overcurrent conditions of a preselected value so that if the signal pulse is of sufficient magnitude, unijunction transistor 58 will be turned on. Upon unijunction transistor 58 being turned on, the base electrode of PNP transistor 64 will be driven sufficiently negative to allow that transistor to become conductive thereby producing a current pulse in primary winding 65 of the pulse transformer. This current pulse produces gating-on pulses in multiple secondary windings 66 which are then supplied to the gating on electrodes of the various short circuiting silicon controlled rectifiers in the fast action, current limiting protective circuits of FIGURES 4, 10, and 11.

A somewhat similar firing circuit suitable for use with the fast action overcurrent protective circuits of FIGURES 4, 10, and 11 is illustrated in FIGURE 9 of the drawings. The firing circuit of FIGURE 9 is somewhat more sensitive and also more stable than the circuit arrangement of FIGURE 8 in that it employs a Schmitt trigger comprised by a pair of NPN transistors 67 and 68 interconnected between unijunction transistor 58 and overcurrent sensing resistors 54 and 55. The Schmitt trigger comprised by transistors 67 and 68 is conventional in construction and will not be described in detail. It is believed sufficient to point out, however, that the Schmitt trigger is a bistable circuit wherein if it is operating in one of its normal states of operation, upon the application of a trigger signal to the base electrode of transistor 67, the circuit will be switched to its second state of operation. For example, consider that the trigger circuit is operating in a manner such that transistor 67 is normally nonconducting. Upon the application of an overcurrent signal to the base electrode of transistor 67, this transistor will be rendered conductive, producing a negative going signal in its collector circuit which is coupled to the base electrode of transistor 68 and operates to turn off transistor 68. Upon transistor 68 being turned off, its collector potential will rise sufficiently to produce a positive going signal that is applied to the emitter of unijunction transistor 58. It should be noted that the Schmitt triggers 67 and 68 will thereafter remain in this condition for a prolonged period so that a continued positive potential will be applied to the emitter charging of unijunction transistor 58. Accordingly, continued energization of the unijunction oscillating, comprising unijunction transistor 58, is assured, and the unijunction oscillator will continue to oscillate for the prolonged period to assure operation of the fast action protective switch. Further, the Schmitt trigger 67–68 is a very sensitive circuit, so that the overall sensitivity of the gating or firing circuit is greatly improved.

An additional form of fast action, current limiting protective circuit for a phase shift type of control is illustrated in FIGURE 5 of the drawings. In FIGURE 5, it is assumed that a control signal having a wave shape, such as shown at 12, is applied across the terminals of the circuit. In the circuit, only a single parallel-connected saturable reactor 71 is employed wherein primary winding 72 and secondary winding 73 are connected in parallel circuit relationship, and the parallel circuit thus formed is connected in series circuit relationship with load 13. A control winding 74 surrounds both the primary and secondary windings of saturable reactor 71 for controlling the point in the period of the applied input signal where the core of the reactor saturates. The circuit of FIGURE 5 is further comprised by a diode bridge formed by a plurality of diodes 75. One set of opposed terminals of diode bridge 75 is connected to the terminal points $a$ and $b$ so as to connect the diode bridge in parallel circuit relationship with the parallel connected windings 72 and 73 of saturable reactor 71. The remaining pair of opposed terminals of the diode bridge are interconnected by a series circuit comprised by linear inductance 76, fast action switch 77, and current limiting resistor 78. By this arrangement, the linear inductance assures the maintenance of a minimum holding current through the fast action switch means to insure that the fast action switch means does not retain its blocking condition prematurely. For example, when actuated by the single pulse trigger circuit of FIGURE 8, it may be possible for the fast action switch to drop out if the additional holding current due to the linear inductance were not present to prevent it from doing so. In other respects, the circuit operates in precisely the same fashion as the circuit shown in FIGURE 3 of the drawings to provide fast action, current limiting protection for the load equipment used with the phase control circuit.

In the embodiment of the invention shown in FIGURE 6 of the drawings, a time delay reactor 76 has been added outside of the diode bridge 75 and is connected between the junction of wave shaping reactor 9 and primary winding 2 of the output coupling transformer employed in load circuit 13. Since this circuit arrangement is very similar to the arrangement of FIGURE 10 with the exception of the substitution of reed switch 77 for the short circuiting silicon controlled rectifier 37, its operation will be almost identical to that of FIGURE 10.

From the foregoing description, it can be appreciated that the invention provides a fast action protective circuit for use in conjunction with a phase shift type of control for rapidly decreasing the output current from an inverter or other load equipment being controlled by the phase shift type control in the event of an overload condition.

Having described several embodiments of a new, fast action, current limiting protective circuit for phase shifting type controls constructed in accordance with the present invention, it is believed obvious that other modifications and variations of the invention are possible in the light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. A fast action protective circuit for a phase shifting control for controlling the output from an electric circuit including in combination first control signal input means operatively coupled to and controlling the degree of phase shift introduced by the phase shifting control over a desired range overload condition sensing means connected in the output of the electric circuit to be protected, and fast-acting switch means operatively connected across the phase shifting control in parallel circuit relationship and actuated by said overload condition sensing means for short circuiting the phase shifting control in response to an overload condition being sensed.

2. The combination set forth in claim 1 wherein said phase shifting control is comprised by a saturable reactor having at least a main winding and a control winding for controlling the phase angle at which the saturable core of the main winding saturates and said fast-acting switch means comprises a solenoid actuated reed switch connected in parallel circuit relationship with said saturable reactor main winding and having its actuating winding operatively coupled in the output circuit of the electrical equipment being controlled for closing said reed switch in response to an overload condition.

3. The combination set forth in claim 1 wherein said phase shifting control is comprised by a saturable reactor having at least a main winding and a control winding for controlling the phase angle at which the saturable core of the main winding saturates and said fast-acting switch means comprises at least one silicon controlled rectifier connected in parallel circuit relationship with said saturable reactor main winding and having its gate electrode operatively coupled to the output of the overload condition sensing means for turning on said silicon controlled rectifier in response to an overload condition.

4. A fast action current limiting protective circuit for a phase shift control used to control the electrical output from an electric circuit including in combination first control signal input means operatively coupled to said phase shift control for controlling the degree of phase shift introduced by the phase shift control over a desired range, an overload condition sensing device connected in the output of the electric circuit to be protected, a gating circuit coupled to and actuated by said overload condition sensing device for developing an electric gating signal in response to an overload condition and at least one gate controlled conducting device operatively connected across the phase shifting control in parallel circuit relationship and having its gate electrode operatively coupled to the output of said gating circuit, said gate controlled conducting device serving to short circuit the phase shifting control and render it ineffective upon being turned on in response to an overload condition being sensed by said sensing device.

5. The combination set forth in claim 4 wherein the phase shift control is comprised by a saturable reactor having at least a main winding and a control winding for controlling the phase angle at which the saturable core of the main winding saturates and said gate controlled conducting device is comprised by at least one silicon controlled rectifier connected in parallel circuit relationship with said saturable reactor main winding and having its gate electrode operatively coupled to the output of the gating circuit for turning on the silicon controlled rectifier in response to an overload condition.

6. A fast action current limiting protective control circuit including in combination a saturable reactor control device for phase shift controlling the output of an electric circuit, said saturable reactor including at least a main winding surrounding a saturable core and a control winding for controlling the point in the period of an applied electric signal at which the saturable core of the main winding saturates and thereby obtains a phase shift control of the output signal derived from the saturable reactor, an overload condition sensing device connected in the output of the electric circuit being controlled, a gating circuit coupled to and actuated by said overload sensing device for developing an electric gating signal in response to an overload condition, and at least one gate controlled silicon controlled rectifier operatively connected across the saturable reactor main winding in parallel circuit relationship and having its gate electrode operatively coupled to the output of said gating circuit for short circuiting the phase shifting control upon being rendered conductive in response to an overload condition being sensed by said overload condition sensing device.

7. The combination set forth in claim 6 wherein the silicon controlled rectifier is included in a diode bridge with the silicon controlled rectifier being connected between one set of opposed terminals of the diode bridge, and with the remaining pair of opposed terminals of the diode bridge being connected across the saturable reactor main winding in parallel circuit relationship.

8. The combination set forth in claim 6 further characterized by a diode bridge with the silicon controlled rectifier being operatively connected between one pair of opposed terminals of the diode bridge and with the remaining pair of opposed terminals of the diode bridge being effectively coupled across the first mentioned saturable reactor thereby connecting the diode bridge and silicon controlled rectifier in parallel circuit relationship with said saturable reactor, and a second saturable reactor effectively coupled in series circuit relationship with said silicon controlled rectifier.

9. A fast action current limiting protective control circuit for an inverter including in combination a saturable reactor control device for phase shift controlling at least one of the gating signals supplied to the inverter to thereby control the magnitude of the output current derived from the inverter, said saturable reactor including at least a main winding surrounding a saturable core and a control winding for controlling the point in the period of an applied electric signal at which the saturable core saturates and thereby obtains a phase shift control of the output signal derived from the saturable reactor, an overload condition sensing device connected in the output of the inverter, a gating circuit coupled to and actuated by said overload sensing device for developing an electric gating signal in response to an overload condition, and at least one gate controlled silicon controlled rectifier operatively coupled across the saturable reactor in parallel circuit relationship and having its gate electrode operatively coupled to the output of said gating circuit for short circuiting the phase shifting control upon being rendered conductive in response to an overload condition being sensed by said overload condition sensing device.

10. A fast action protective circuit for quickly limiting the current supplied from an inverter including in combination a first source of switching potential operatively coupled to the inverter for partially controlling the same, a phase shift control device connected in circuit relationship with said first source of switching potential for phase shifting the first switching potential a predetermined amount, a second source of switching potential operatively coupled to the output of the phase shift control device for deriving a second switching potential phase shifted by an amount determined by said phase shift control device, the output of said second source of switching potential being operatively coupled to the inverter for controlling the operation of the inverter in conjunction with said first switching potential source, overload condition sensing means connected in the output of the inverter, and fast action switch means operatively connected across said phase shift control device in parallel circuit relationship and actuated by said overload sensing means for short circuiting the phase shifting control device in rapid response to an overload condition being sensed.

11. The combination set forth in claim 1 wherein said phase shift control device is comprised by a saturable reactor having at least a main winding and a control winding for controlling the phase angle at which the saturable core of the main winding saturates and said fast-acting switch means comprises at least one silicon controlled rectifier connected in parallel circuit relationship with said saturable reactor main winding and having its gate electrode operatively coupled to the output of the overload condition sensing means for turning on said silicon controlled rectifier in response to an overload condition.

12. The combination set forth in claim 1 further characterized by a second phase shift control effectively coupled in series circuit relationship with the fast action switch means for further controlling the response of the circuit to an overload condition.

13. The combination set forth in claim 1 wherein said phase shifting type of control is comprised by a saturable reactor having at least a main winding and a control winding for controlling the phase angle at which the saturable core of the main winding saturates and said fast-acting switch means comprises at least one silicon controlled rectifier connected in parallel circuit relationship with said saturable reactor main winding and having its gate electrode operatively coupled to the output of the overload condition sensing means for turning on said silicon controlled rectifier in response to an overload condition, and further characterized by a second saturable reactor effectively coupled in series circuit relationship with the silicon controlled rectifier for further controlling the response of the circuit to an overload condition.

References Cited by the Examiner

UNITED STATES PATENTS

| | | | |
|---|---|---|---|
| 2,547,162 | 4/1951 | Kidd | 321—18 |
| 2,833,977 | 5/1958 | Levy et al. | 321—14 X |
| 3,103,619 | 9/1963 | Du Vall. | |
| 3,128,440 | 4/1964 | Davis | 323—22 X |

FOREIGN PATENTS 883,349  11/1961  Great Britain.

OTHER REFERENCES

"Controlled Rectifier Power Supply Is Short-Circuit Protected," by B. Berman, published in Electronic Design (November 11, 1959), p. 168.

JOHN F. COUCH, *Primary Examiner.*

LLOYD McCOLLUM, *Examiner.*

G. J. BUDOCK, J. C. SQUILLARO, W. H. BEHA,
*Assistant Examiners.*